US010334583B2

(12) United States Patent
Yan et al.

(10) Patent No.: US 10,334,583 B2
(45) Date of Patent: *Jun. 25, 2019

(54) METHOD FOR SENDING AND RECEIVING CONTROL INFORMATION, APPARATUS AND COMMUNICATION SYSTEM

(71) Applicant: Huawei Technologies Co., Ltd., Shenzhen (CN)

(72) Inventors: Zhiyu Yan, Shenzhen (CN); Yang Li, Beijing (CN); Lei Wan, Beijing (CN); Sha Ma, Beijing (CN); Xiaotao Ren, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,507

(22) Filed: Dec. 22, 2017

(65) Prior Publication Data
US 2018/0124758 A1    May 3, 2018

Related U.S. Application Data

(63) Continuation of application No. 15/366,961, filed on Dec. 1, 2016, now Pat. No. 9,872,288, which is a (Continued)

(30) Foreign Application Priority Data

Sep. 30, 2009    (CN) .......................... 2009 1 0204963

(51) Int. Cl.
*H04W 72/04*    (2009.01)
*H04L 5/00*    (2006.01)
*H04W 84/04*    (2009.01)

(52) U.S. Cl.
CPC .......... *H04W 72/042* (2013.01); *H04L 5/001* (2013.01); *H04L 5/0035* (2013.01); (Continued)

(58) Field of Classification Search
None
See application file for complete search history.

(56) References Cited

U.S. PATENT DOCUMENTS 9,124,411 B2    9/2015   Yan et al.
9,220,097 B2    12/2015  Yan et al.
(Continued)

FOREIGN PATENT DOCUMENTS

CN    101005362 A    7/2007
CN    101399640 A    4/2009
(Continued)

OTHER PUBLICATIONS

U.S. Appl. No. 15/366,961, filed Dec. 1, 2016.
(Continued)

*Primary Examiner* — Otis L Thompson, Jr.
(74) *Attorney, Agent, or Firm* — Leydig, Voit & Mayer, Ltd.

(57) ABSTRACT

The present invention provides a method for sending and receiving control information, an apparatus and a communication system. The method for sending control information includes: setting respective control bits in a downlink control information (DCI) format to generate control information applied by a network side to a terminal, wherein indication information indicating whether to swap a corresponding relationship between a transmission block and a codeword is not carried in a control bit in the DCI format, if a dedicated demodulation reference signal used to demodulate data is preconfigured by the network side for the terminal and respective codewords correspond to the same
(Continued)

number of layers; and the indication information is carried in a control bit in the DCI format, if the dedicated demodulation reference signal used to demodulate data is not preconfigured by the network side for the terminal; and sending the generated control information to the terminal.

12 Claims, 6 Drawing Sheets

Related U.S. Application Data continuation of application No. 14/952,739, filed on Nov. 25, 2015, now Pat. No. 9,544,894, which is a continuation of application No. 14/810,951, filed on Jul. 28, 2015, now Pat. No. 9,220,097, which is a continuation of application No. 13/435,844, filed on Mar. 30, 2012, now Pat. No. 9,124,411, which is a continuation of application No. PCT/CN2010/077480, filed on Sep. 29, 2010.

(52) U.S. Cl.
CPC .......... *H04L 5/0048* (2013.01); *H04L 5/0051* (2013.01); *H04L 5/0094* (2013.01); *H04W 84/042* (2013.01)

(56) References Cited

U.S. PATENT DOCUMENTS

| | | | |
|---|---|---|---|
| 9,544,894 B2 | 1/2017 | Yan et al. | |
| 2005/0019016 A1 | 1/2005 | Nakashika et al. | |
| 2005/0123284 A1 | 6/2005 | Kikuchi et al. | |
| 2005/0188031 A1 | 8/2005 | Zandt | |
| 2005/0249104 A1 | 11/2005 | Hisada et al. | |
| 2005/0249140 A1 | 11/2005 | Lee et al. | |
| 2005/0286871 A1 | 12/2005 | Kikuchi et al. | |
| 2008/0014937 A1 | 1/2008 | Laroia et al. | |
| 2009/0305698 A1* | 12/2009 | Zhang ................... | H04L 1/0028 455/434 |
| 2010/0031117 A1 | 2/2010 | Lee et al. | |
| 2010/0034303 A1* | 2/2010 | Damnjanovic ......... | H04L 5/003 375/260 |
| 2010/0056079 A1 | 3/2010 | Onggosanusi et al. | |
| 2010/0098012 A1 | 4/2010 | Bala et al. | |
| 2010/0202389 A1 | 8/2010 | Cai et al. | |
| 2010/0303034 A1 | 12/2010 | Chen et al. | |
| 2010/0323709 A1 | 12/2010 | Nam et al. | |
| 2011/0026622 A1 | 2/2011 | Luo et al. | |
| 2011/0064159 A1 | 3/2011 | Ko et al. | |
| 2011/0075624 A1 | 3/2011 | Papasakellariou et al. | |
| 2011/0099305 A1 | 4/2011 | Dai et al. | |
| 2011/0194504 A1 | 8/2011 | Gorokhov et al. | |
| 2011/0205988 A1* | 8/2011 | Zhang ................... | H04L 5/0053 370/329 |
| 2011/0222485 A1* | 9/2011 | Nangia ................ | H04B 7/0452 370/329 |
| 2011/0237283 A1 | 9/2011 | Shan et al. | |
| 2012/0113944 A1 | 5/2012 | Yang et al. | |
| 2012/0147831 A1 | 6/2012 | Golitschek et al. | |
| 2012/0151285 A1 | 6/2012 | Aue | |
| 2012/0218882 A1 | 8/2012 | Ko et al. | |
| 2014/0213315 A1 | 7/2014 | Kim et al. | |
| 2014/0269453 A1 | 9/2014 | Papasakellariou | |
| 2014/0293843 A1 | 10/2014 | Papasakellariou et al. | |
| 2014/0334397 A1 | 11/2014 | Chen et al. | |
| 2015/0063231 A1 | 3/2015 | Seo et al. | |

FOREIGN PATENT DOCUMENTS

| | | |
|---|---|---|
| CN | 101404526 A | 4/2009 |
| CN | 101541063 A | 9/2009 |
| EP | 1708413 A1 | 10/2006 |
| EP | 2086145 A2 | 8/2009 |
| RU | 2370894 C2 | 10/2009 |
| WO | 2008066347 A1 | 6/2008 |
| WO | 2009004012 A1 | 1/2009 |
| WO | 2009042290 A1 | 4/2009 |
| WO | 2009088167 A1 | 7/2009 |

OTHER PUBLICATIONS

U.S. Appl. No. 14/952,739, filed Nov. 25, 2015.
U.S. Appl. No. 14/810,951, filed Jul. 28, 2015.
U.S. Appl. No. 13/435,844, filed Mar. 30, 2012.
U.S. Appl. No. 15/839,789, filed Dec. 12, 2017.
"3rd Generation Partnership Project; Technical Specification Group Radio Access Network; Evolved Universal Terrestrial Radio Access (E-UTRA); Physical layer procedures (Release 8)," 3GPP TS 36.213 V8.8.0, pp. 1-77, 3rd Generation Partnership Project, Valbonne, France (Sep. 2009).
"3rd Generation Partnership Project; Technical Specification Group Radio Access Network; Evolved Universal Terrestrial Radio Access (E-UTRA); Multiplexing and channel coding (Release 8)," 3GPP TS 36.212 V8.7.0, pp. 1-60, 3rd Generation Partnership Project, Valbonne, France (May 2009).
"On downlink control signaling on dual layer beamforming," 3GPP TSG-RAN WG1 #59bis, Miyazaki, Japan, R1-094264, XP050388727, 3rd Generation Partnership Project, Valbonne, France (Aug. 24-28, 2009).
"Single codeword indication on DCI format 2," 3GPP TSG-RAN WG1 Meeting #53b, Warsaw, Poland, R1-082400, XP050110681, 3rd Generation Partnership Project, Valbonne, France (Jun. 30-Jul. 4, 2008).

* cited by examiner

METHOD FOR SENDING AND RECEIVING CONTROL INFORMATION, APPARATUS AND COMMUNICATION SYSTEM

CROSS-REFERENCE TO RELATED APPLICATIONS

This application is a continuation of U.S. patent application Ser. No. 15/366,961, filed on Dec. 1, 2016, which is a continuation of patent application Ser. No. 14/952,739, filed on Nov. 25, 2015, now U.S. Pat. No. 9,544,894, which is a continuation of U.S. patent application Ser. No. 14/810,951, filed on Jul. 28, 2015, now U.S. Pat. No. 9,220,097, which is a continuation of U.S. patent application Ser. No. 13/435,844, filed on Mar. 30, 2012, now U.S. Pat. No. 9,124,411, which is a continuation of International Application No. PCT/CN2010/077480, filed on Sep. 29, 2010, which claims priority to Chinese Patent Application No. 200910204963.2, filed on Sep. 30, 2009. The afore-mentioned patent application and patents are hereby incorporated by reference in their entireties.

FIELD OF THE INVENTION

The present invention relates to the field of communication technologies, and in particular, to a method for sending and receiving control information, an apparatus and a communication system.

BACKGROUND OF THE INVENTION

In a Long Term Evolved (Long Term Evolved, abbreviated as LTE) system put forward by the Third Generation Partnership Project (Third Generation Partnership Project, abbreviated as 3GPP) organization, downlink transmission channels mainly include: physical downlink control channel (Physical downlink control channel, abbreviated as PDCCH) and physical downlink shared channel (Physical downlink shared channel, abbreviated as PDSCH), which are used to transmit downlink control information (Downlink control information, abbreviated as DCI) and downlink data respectively. In an LTE Rel.8 system, the downlink data may be transmitted by using different transmission modes. Each transmission mode may include two DCI formats (Format). In the DCI format, each control bit may indicate control information required by a PDSCH data transmission scheme under a specific transmission mode. A network side configures a specific data transmission mode for each terminal in a semi-static manner. Under a specific transmission mode, each control bit of the DCI format is configured dynamically so that the control information required by the PDSCH data transmission scheme is indicated to a user. The terminal blindly detects each control bit of the two DCI formats and obtains the control information required by the PDSCH data transmission scheme of the terminal.

In the DCI format defined by the LTE Rel.8 system, the DCI format 2 and DCI format 2A support a transmission control indication of two codewords (Codeword, abbreviated as CW). Control bits in the transmission control indication include: a transmission control bit of a transmission block (Transmission Block, abbreviated as TB), and a control bit of indication information indicating whether to swap a corresponding relationship between the transmission block and the codeword (namely a "TB to CW swap flag" control bit), and so on. Transmission control bits of each transmission block includes: a modulation and coding scheme (Modulation and Coding Scheme, abbreviated as MCS) indication bit, a new data indicator (New data indicator, NDI) bit, and a redundancy version (Redundancy version, abbreviated as RV) indication bit. The network side correspondingly indicates the control information of the two transmission blocks in the foregoing control bits. The terminal detects each control bit in the DCI format to determine the control information of the current PDSCH data transmission.

In the process of implementing embodiments of the present invention, the inventor finds that in the prior art: Efficiency of using the control bits is improper in a frame structure that supports transmission of two codewords, therefore a technical defect that efficiency of using an overhead required for transmitting control information is low exists.

SUMMARY OF THE INVENTION

Embodiments of the present invention provide a method for sending and receiving control information, an apparatus and a communication system, which are used to improve efficiency of using an overhead required for transmitting control information.

An embodiment of the present invention provides a method for sending control information, where the method includes:

setting respective control bits in a downlink control information (DCI) format to generate control information applied by a network side to a terminal, wherein indication information indicating whether to swap a corresponding relationship between a transmission block and a codeword is not carried in a control bit in the DCI format, if a dedicated demodulation reference signal used to demodulate data is preconfigured by the network side for the terminal and respective codewords correspond to the same number of layers; and the indication information indicating whether to swap the corresponding relationship between the transmission block and the codeword is carried in a control bit in the DCI format, if the dedicated demodulation reference signal used to demodulate data is not preconfigured by the network side for the terminal; and sending the generated control information to the terminal.

An embodiment of the present invention provides a method for receiving control information, where the method includes:

receiving control information sent by a network side; and obtaining control bits in a downlink control information (DCI) format generating the control information applied by the network side to a terminal, wherein indication information indicating whether to swap a corresponding relationship between a transmission block and a codeword is not carried in a control bit in the DCI format, if a dedicated demodulation reference signal used to demodulate data is preconfigured by the network side for the terminal and respective codewords correspond to the same number of layers; and the indication information indicating whether to swap the corresponding relationship between the transmission block and the codeword is carried in a control bit in the DCI format, if a dedicated demodulation reference signal used to demodulate data is not preconfigured by the network side for the terminal.

An embodiment of the present invention provides a network side device, where the network side device includes:

a control information generating module, configured to set respective control bits in a downlink control information (DCI) format to generate control information applied by a network side to a terminal, wherein indication information indicating whether to swap a corresponding relationship between a transmission block and a codeword is not carried in a control bit in the DCI format, if a dedicated demodulation reference signal used to demodulate data is preconfigured by the network side for the terminal and respective codewords correspond to the same number of layers; and the indication information indicating whether to swap the corresponding relationship between the transmission block and the codeword is carried in a control bit in the DCI format, if the dedicated demodulation reference signal used to demodulate data is not preconfigured by the network side for the terminal; and a control information sending module, configured to send the generated control information to the terminal.

An embodiment of the present invention provides a terminal side device, where the terminal side device includes:

a control information receiving module, configured to receive control information sent by a network side; and a control bit resolving module, configured to obtain control bits in a downlink control information (DCI) format generating the control information applied by the network side to a terminal, wherein indication information indicating whether to swap a corresponding relationship between a transmission block and a codeword is not carried in a control bit in the DCI format, if a dedicated demodulation reference signal used to demodulate data is preconfigured by the network side for the terminal and respective codewords correspond to the same number of layers; and the indication information indicating whether to swap the corresponding relationship between the transmission block and the codeword is carried in a control bit in the DCI format, if a dedicated demodulation reference signal used to demodulate data is not preconfigured by the network side for the terminal.

In the embodiments of the present invention, the network side device extends or changes functions of some control bits in the DCI format of the control information, so as to improve efficiency of using a resource overhead occupied by the control bits in the DCI format of the control information, and improve the efficiency of using the overhead required for transmitting the control information.

BRIEF DESCRIPTION OF THE DRAWINGS

To make the technical solutions according to the embodiments of the present invention or in the prior art clearer, the following outlines accompanying drawings involved in the description of the embodiments or the prior art. Apparently, the accompanying drawings outlined below are merely some embodiments of the present invention, and persons of ordinary skill in the art may further obtain other drawings from these accompanying drawings without making creative efforts.

DETAILED DESCRIPTION OF THE EMBODIMENTS

The technical solutions according to the embodiments of the present invention are described clearly and completely in conjunction with the accompanying drawings in the embodiments of the present invention. Evidently, the embodiments to be described are merely part of rather than all of the embodiments of the present invention. Based on the embodiments of the present invention, all other embodiments obtained by those of ordinary skill in the art without making creative efforts shall fall within the protection scope of the present invention.

Figure 1A:
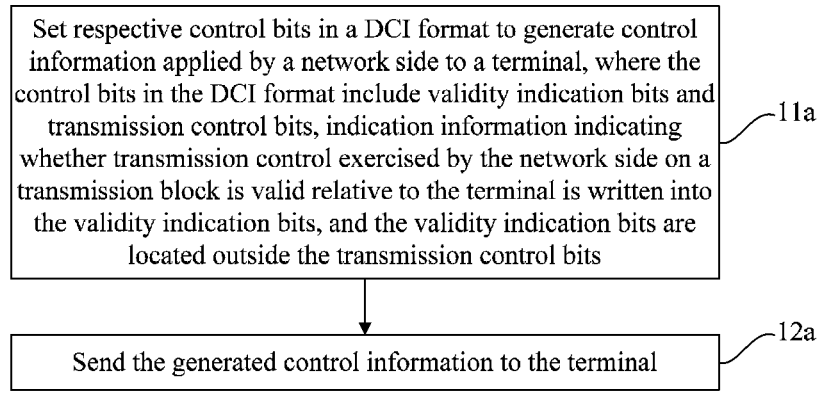
FIG. 1a is a flowchart of a method for sending control information according to a first embodiment of the present invention.

FIG. 1a is a flowchart of a method for sending control information according to a first embodiment of the present invention. An executing subject of this embodiment may be a network side device. As shown in FIG. 1a, the method for sending control information in this embodiment includes:

Step 11a: Set respective control bits in a DCI format to generate control information applied by a network side to a terminal, where the control bits in the DCI format include validity indication bits and transmission control bits, indication information indicating whether transmission control exercised by the network side on a transmission block is valid relative to the terminal is written into the validity indication bits, and the validity indication bits are located outside the transmission control bits.

The network side may predetermine a bit among the respective control bits in the DCI format, and write into this bit the indication information indicating whether transmission control exercised by the network side on a transmission block is valid relative to the terminal. The control bit into which the indication information indicating whether the transmission control on the transmission block is valid relative to the terminal is written is a validity indication bit in the embodiment of the present invention. The validity indication bits are located outside the transmission control bits.

Writing of transmission control indications of one or more transmission blocks may be supported by the DCI format. The number of bits that need to be occupied by transmission block status indication bits in the DCI format may be set according to an actual requirement. For example, if writing of transmission control indications of multiple transmission blocks is supported by the DCI format, the number of bits occupied by the validity indication bits in the DCI format may be less than or equal to the number of transmission blocks of transmission control indications, the writing of which is supported by the DCI format. Indication information indicating whether transmission control exercised by the network side on a corresponding transmission block is valid relative to the terminal is written into at least one of the validity indication bits according to a predetermined mapping relationship between each of the validity indication bits and the transmission block.

Step 12a: Send the generated control information to the terminal.

A terminal side receives the control information and detects the respective control bits in the DCI format of the control information. According to meanings represented by values of the respective control bits, where the meanings represented by the values of the respective control bits are negotiated between the terminal side and the network side, the terminal side may obtain the control information such as the indication indicating whether the transmission control exercised by the network side on the transmission block is valid relative to the current terminal. The terminal may communicate with the network side according to the obtained control information.

In the method for sending control information in this embodiment, the network side predetermines the validity indication bits in the DCI format of the control information, and writes into the validity indication bits the indication information indicating whether the transmission control exercised by the network side on the transmission block is valid relative to the terminal. In this embodiment, 1 bit is enough for indicating whether the transmission control exercised by the network side on any transmission block is valid relative to the terminal, which saves a resource overhead required to be occupied. The saved overhead may be used for transmitting other control information. Therefore, efficiency of using an overhead required for transmitting the control information on the network side is improved. Further, in this embodiment, the same DCI format may be used to indicate control information corresponding to different downlink data transmission schemes in different scenarios such as valid transmission control on the transmission block and invalid transmission control on the transmission block. Therefore, a flexible and dynamical swap between different downlink data transmission schemes is achieved.

Figure 1B:
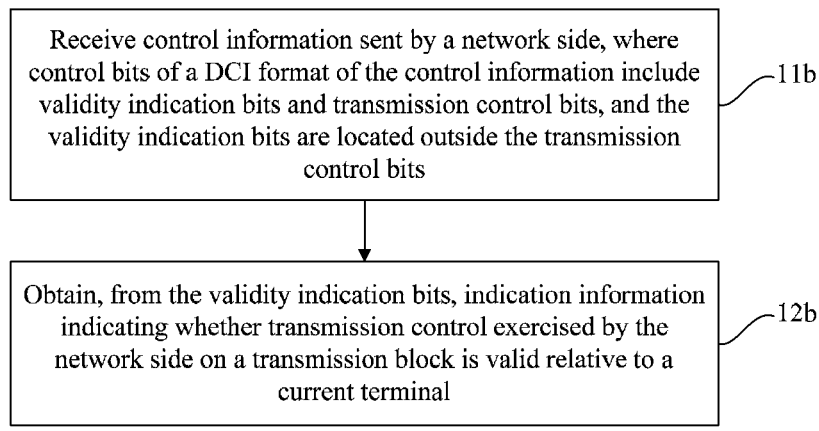
FIG. 1b is a flowchart of a method for receiving control information according to a second embodiment of the present invention.

FIG. 1b is a flowchart of a method for receiving control information according to a second embodiment of the present invention. An executing subject of this embodiment may be a terminal side device. As shown in FIG. 1b, the method for receiving control information in this embodiment includes:

Step 11b: Receive control information sent by a network side, where control bits of a DCI format of the control information include validity indication bits and transmission control bits, and the validity indication bits are located outside the transmission control bits.

Transmission control indications of one or more transmission blocks may be written into the DCI format. The number of bits that need to be occupied by the validity indication bits in the DCI format may be set by the network side according to an actual requirement. For example, if transmission control indications of multiple transmission blocks are written into the DCI format, the number of bits occupied by the validity indication bits in the DCI format may be less than or equal to the number of transmission blocks of transmission control information that may be written into the DCI format.

Step 12b: Obtain, from the validity indication bits, indication information indicating whether transmission control exercised by the network side on a transmission block is valid relative to a current terminal.

The terminal side receives the control information and detects respective control bits in the DCI format of the control information. According to meanings represented by values of the respective control bits, where the meanings represented by the values of the respective control bits are negotiated between the terminal side and the network side, the terminal side may obtain the information such as the indication indicating whether the transmission control exercised by the network side on the transmission block is valid relative to the current terminal. For example, according to a predetermined mapping relationship between each of the validity indication bits and the transmission block, the terminal side obtains indication information carried in each of the validity indication bits, and determines, according to the obtained indication information, whether the transmission control exercised by the network side on the corresponding transmission block is valid relative to the current terminal.

In the method for receiving control information in this embodiment, by detecting one bit of the validity indication bits in the DCI format, the terminal side obtains the indication information indicating whether the control exercised by the network side on a transmission block is valid relative to the current terminal, which saves a resource overhead required to be occupied by the indication indicating whether the transmission control on the transmission block is valid. The saved overhead may be used for transmitting other control information. Therefore, efficiency of using the overhead required for transmitting the control information on the network side is improved, and efficiency of obtaining the downlink control information by the terminal side is also improved. Further, in this embodiment, the same DCI format may be used to obtain control information corresponding to different downlink data transmission schemes in different scenarios such as valid transmission control on the transmission block and invalid transmission control on the transmission block. Therefore, a flexible and dynamical swap between different downlink data transmission schemes is achieved.

Figure 2A:
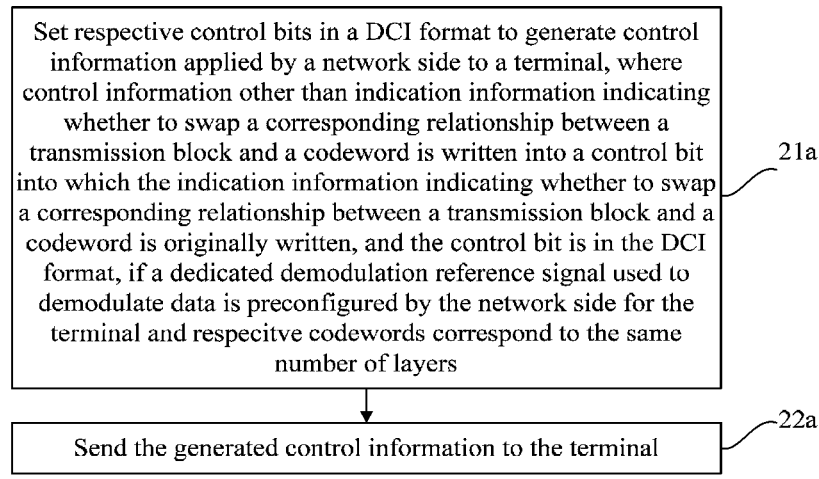
FIG. 2a is a flowchart of a method for sending control information according to a third embodiment of the present invention.

FIG. 2a is a flowchart of a method for sending control information according to a third embodiment of the present invention. An executing subject of this embodiment may be a network side device. As shown in FIG. 2a, the method for sending control information in this embodiment includes:

Step 21a: Set respective control bits in a DCI format to generate control information applied by a network side to a terminal, where control information other than indication information indicating whether to swap a corresponding relationship between a transmission block and a codeword is written into a control bit into which the indication information indicating whether to swap a corresponding relationship between a transmission block and a codeword is originally written, and the control bit is in the DCI format of the control information, if a dedicated demodulation reference signal used to demodulate data is preconfigured by the network side for the terminal and respective codewords correspond to the same number of layers.

The other control information includes at least one of the following: indication information indicating whether transmission control exercised by the network side on the corresponding transmission block is valid relative to the terminal; indication information indicating an orthogonal reference signal occupied by the dedicated demodulation reference signal of the terminal; information indicating locations of resources such as a time frequency occupied by the dedicated demodulation reference signal on scheduled resources of the terminal; configuration information about the number of orthogonal frequency division multiplexing symbols occupied by physical downlink control channels of multiple cells under a coordinated multiple points transmission scheme; the number of layers occupied by the terminal; indication information indicating whether current control information is uplink control information or downlink control information; indication information indicating component carriers of carrier aggregation; and uplink feedback scheme indication information or uplink scheduling information.

The control bits in the DCI format include a control bit into which the indication information indicating whether to swap a corresponding relationship between a transmission block and a codeword is written (namely a "TB to CW swap flag" control bit). If a dedicated demodulation reference signal used to demodulate data is preconfigured by the network side for the terminal, and respective codewords correspond to the same number of layers, the indication information indicating whether to swap a corresponding relationship between a transmission block and a codeword is meaningless redundant indication information in a current transmission status. Therefore, the control information other than the indication information indicating whether to swap a corresponding relationship between a transmission block and a codeword may be written into the "TB to CW swap flag" control bit.

Step 22a: Send the generated control information to the terminal.

The terminal side receives the control information and detects the respective control bits in the DCI format of the control information. From the "TB to CW swap flag" control bit, the terminal may obtain the control information other than the information indicating whether to swap the corresponding relationship between the transmission block and the codeword.

In the method for sending control information in this embodiment, a function of the "TB to CW swap flag" control bit is determined with reference to the current transmission status of the transmission block. If the indication information indicating whether to swap a corresponding relationship between a transmission block and a codeword is meaningless redundant indication information in the current transmission status, the control information other than the information indicating whether to swap the corresponding relationship between the transmission block and the codeword may be written into the "TB to CW swap flag" control bit, which saves a resource overhead required to be occupied for transmitting other control information, and improves efficiency of using an overhead required for transmitting the control information on the network side.

Figure 2B:
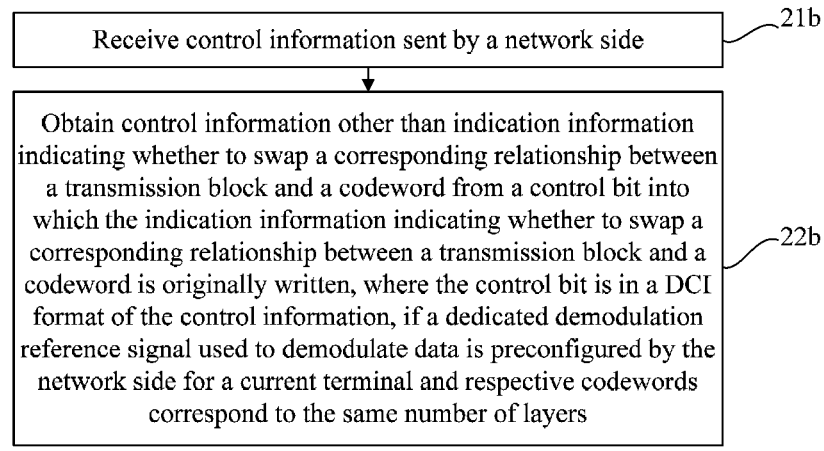
FIG. 2b is a flowchart of a method for receiving control information according to a fourth embodiment of the present invention.

FIG. 2b is a flowchart of a method for receiving control information according to a fourth embodiment of the present invention. An executing subject of this embodiment may be a terminal side device. As shown in FIG. 2b, the method for receiving control information in this embodiment includes:

Step 21b: Receive control information sent by a network side.

The network side sets respective control bits in a DCI format to generate the control information, and sends the generated control information to the terminal side.

Step 22b: Obtain control information other than indication information indicating whether to swap a corresponding relationship between a transmission block and a codeword, from a control bit into which the indication information indicating whether to swap a corresponding relationship between a transmission block and a codeword is originally written, where the control bit is in the DCI format of the control information, if a dedicated demodulation reference signal used to demodulate data is preconfigured by the network side for a current terminal and respective codewords correspond to the same number of layers.

The control bits in the DCI format include a control bit into which the indication information indicating whether to swap a corresponding relationship between a transmission block and a codeword is written (namely a "TB to CW swap flag" control bit). If a dedicated demodulation reference signal used to demodulate data is preconfigured by the network side for the terminal, and respective codewords correspond to the same number of layers, the indication information indicating whether to swap a corresponding relationship between a transmission block and a codeword is meaningless redundant indication information in a current transmission status. Therefore, the control information other than the indication information indicating whether to swap a corresponding relationship between a transmission block and a codeword may be written into the "TB to CW swap flag" control bit. By detecting the "TB to CW swap flag" control bit, the current terminal may obtain the control information other than the information indicating whether to swap the corresponding relationship between the transmission block and the codeword.

In the method for receiving control information in this embodiment, if the indication information indicating whether to swap a corresponding relationship between a transmission block and a codeword is meaningless redundant indication information in the current transmission status, a function of the "TB to CW swap flag" control bit is determined with reference to the current transmission status of the transmission block, and the control information other than the information indicating whether to swap a corresponding relationship between a transmission block and a codeword is written into the "TB to CW swap flag" control bit. By detecting the "TB to CW swap flag" control bit, the current terminal may obtain the control information other than the information indicating whether to swap a corresponding relationship between a transmission block and a codeword, which saves a resource overhead required to be occupied for transmitting other control information, and improves efficiency of using an overhead required for transmitting the control information on the network side.

Figure 3:
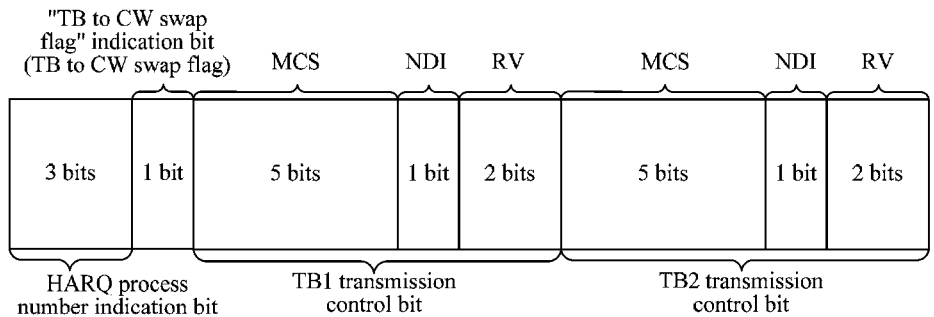
FIG. 3 is a schematic diagram of some control bits in a DCI format that supports transmission of two codewords in a comparative instance according to the present invention.

FIG. 3 is a schematic diagram of some control bits in a DCI format that supports transmission of two codewords in a comparative instance according to the present invention. FIG. 3 only shows some control bits related to a transmission block in the DCI format that supports a transmission control indication of two codewords in an LTE Rel.8 system, for example, some control bits in the DCI format 2 and the DCI format 2A are defined in the LTE Rel.8 system. Some control bits in the DCI format, the number of resources occupied by such control bits and functions of such control bits shown in FIG. 3 are described as follows:

"HARQ process number": occupies 3 bits, into which indication information about a Hybrid Automatic Retransmission Request (HARQ) process number is written, and may be called "HARQ process number indication bit";

TB1 transmission control bits: occupy 8 bits, into which transmission control information of a transmission block is written;

TB2 transmission control bits: occupy 8 bits, into which transmission control information of another transmission block is written; and "TB to CW swap flag" control bit: occupies 1 bit, into which indication information indicating whether to swap a corresponding relationship between a transmission block and a codeword is written, and may be called "TB to CW swap indication bit". It is assumed that two codewords that may be mapped to the transmission block are a CW0 and a CW1 respectively. By default, a TB1 corresponds to the CW0, and a TB2 corresponds to the CW1. If the value of the "TB to CW swap flag" control bit is 0, it indicates that the corresponding relationship between the transmission block and the codeword is not swapped. That is, the TB1 corresponds to the CW0, and the TB2 corresponds to the CW1. If the value of the "TB to CW swap flag" control bit is 1, it indicates that the corresponding relationship between the transmission block and the codeword is swapped, and in this case, the TB2 corresponds to the CW0, and the TB1 corresponds to the CW1.

The transmission control bits of each transmission block (TB1 transmission control bits or TB2 transmission control bits) are divided into the following bits:

MCS indication bits: occupy 3 bits, into which indication information indicating a modulation and coding scheme applied to the data transmitted in a current transmission block;

NDI indication bit: occupies 1 bit, into which indication information indicating a type of data transmitted in a current transmission block, for example, indicating whether the data transmitted in the current transmission block is new data or retransmitted old data; and RV indication bits: occupy 2 bits, into which indication information indicating a redundancy version.

Corresponding control information is written into the foregoing MCS indication bits, NDI indication bit and RV indication bits, which are original transmission control indications of the transmission block described in the embodiment of the present invention.

In the process of implementing the embodiments of the present invention, the inventor finds that: In the LTE Rel.8 system, certain control bits are used improperly in the DCI format that supports the transmission control indication of two codewords, as reflected in the following:

1. Overhead using of TB control bits indicating that a transmission block is invalid:

In an LTE Rel.8 system, if data transmitted in a current transmission block is unrelated to a terminal, by setting 7 bits included in the MCS indication bits and the NDI indication bit in the transmission control bits corresponding to the transmission block in the DCI format to specific values, the network side notifies the terminal that transmission control exercised by the network side on this transmission block is invalid relative to a terminal. For example, if data transmitted in the current TB2 is unrelated to a terminal, the network side sets all the 7 bits included in the MCS indication bits and the NDI indication bit among the TB2 control bits to 0, so as to indicate that the transmission control currently exercised by the network side on the TB2 is invalid relative to the terminal, and sends the control information that is set according to the DCI format to the terminal. The terminal receives the control information and detects the respective control bits in the DCI format of the control information. If a detection result of the terminal indicates that the 7 bits included in the MCS indication bits and the NDI indication bit in the TB2 transmission control bits are all 0, the terminal determines that the data transmitted in the TB2 are not sent to the terminal, namely, determines that the transmission control exercised by the network side on the TB2 is invalid relative to the terminal.

It is assumed that, at a specific scheduling time, transmission control exercised by the network side on a transmission block is valid relative to a terminal A, but transmission control exercised by the network side on another transmission block is invalid relative to the terminal A, for example, in an application scenario that transmission control on the TB1 is valid relative to the terminal A, but transmission control on the TB2 is invalid relative to the terminal A, the network side in the existing LTE Rel.8 system uses 7 bits (bits occupied by the MCS indication bits and the RV indication bits) in the TB2 control bits to indicate that the transmission control exercised by the network side on the TB2 is invalid relative to the terminal A. Consequently, efficiency of using the control bits is improper at all, and a utilization rate of an overhead of the transmission control information is low. Therefore, the bits occupied by the information indicating that transmission control on a transmission block is invalid relative to a terminal in the DCI format may be saved, and the saved resource overhead may be used for transmitting other control information.

2. Resource overhead occupied by the "TB to CW swap flag" control bit:

In the LTE Rel.8 system, if control exercised by the network side on the two transmission blocks, the TB1 and the TB2, are both valid relative to the terminal, the network side uses a "TB to CW swap flag" control bit in the DCI format to indicate control information required by the terminal for demodulating data. Specifically, in the process of communication between the network side and the terminal side, the network side sends the same common reference information to each terminal, and determines a precoding matrix (Precoding Matrix, abbreviated as PM) used by each terminal. The network side uses a precoding matrix indicator (PM Indicator, abbreviated as PMI), to notify a corresponding terminal of the precoding matrix used for precoding of a user. The PMI is delivered through a dedicated control bit (not shown in FIG. 3). According to the common reference signal and the received PMI information, the terminal determines a channel estimated value required for demodulating the received data.

In the LTE Rel.8 system, the "TB to CW swap flag" control bit is used to indicate whether to swap the corresponding relationship between the transmission block and the codeword in the case that the transmission control exercised by the network side on the TB1 and the TB2 are both valid relative to a terminal. In an application scenario that the transmission control is valid on only one transmission block, the indication information written into the "TB to CW swap flag" control bit is actually meaningless. In this application scenario, the resource overhead occupied by the "TB to CW swap flag" control bit may be used for transmitting other control information.

Besides, with the continuous evolution of an LTE system version, a communication mode of an LTE system of a higher version such as LTE Rel.9 or LTE Rel.10 is different in comparison with that of the LTE Rel.8 system. In a possible implementation mode of the LTE Rel.9 or LTE Rel.10 system, the network side does not need to indicate whether to swap the corresponding relationship between the transmission block of the terminal and the codeword of the terminal, and the resource overhead occupied by the "TB to CW swap flag" control bit may be used for transmitting other control information. Specifically, in a possible implementation mode of the LTE Rel.9 or LTE Rel.10 system, the network side determines a dedicated demodulation reference signal for each terminal, and, according to the dedicated demodulation reference signal corresponding to the terminal, the terminal may determine a channel estimated value required for demodulating data, and does not need to obtain the PMI information to determine the channel estimated value. On the other hand, whether to swap the mapping between the transmission block and the codeword may be completed by determining whether to swap precoding vectors in a precoding matrix corresponding to a layer mapped to each codeword. The network side does not need to indicate the precoding information to the user in the case that the network side determines the dedicated reference signal for each terminal, and therefore, the network side does not need to indicate to the user information about whether to swap the corresponding relationship between the transmission block and the codeword.

Therefore, if indication information that may be written into certain control bits in the DCI format are meaningless redundant indication information in the current transmission status, such control bits (such as a PMI dedicated control bit or the "TB to CW swap flag" control bit) may be used for transmitting other control information.

For example, the foregoing other control information may be: indication information indicating an orthogonal reference signal occupied by a dedicated demodulation reference signal of the terminal A when the data of multiple users share the same time-frequency resources and in the case that their dedicated demodulation reference signals are orthogonal; or information indicating whether a single user occupies currently-scheduled time-frequency resources exclusively or multiple users share the currently-scheduled time-frequency resources; information indicating locations of resources such as a time frequency occupied by a dedicated demodulation reference signal on scheduled resources of the terminal A when a load occupied by a dedicated demodulation reference signal of a user is variable; configuration information indicating the number of Orthogonal Frequency Division Multiplexing (Orthogonal Frequency Division Multiplexing, abbreviated as OFDM) symbols occupied by PDCCHs of multiple cells during joint sending from multiple cells under a coordinated multiple points (Coordinated multiple points, abbreviated as CoMP) transmission scheme; information indicating the number of layers occupied by the terminal in the case that the user data is adaptive; information indicating whether the control information of the terminal is uplink or downlink control information when the network side applies the same length of control bits of the DCI format to the uplink scheduling information of the terminal and the downlink scheduling information of the terminal; indication information indicating component carriers of the terminal in the case of carrier aggregation; and information indicating an uplink feedback scheme of the terminal in the case that the terminal has multiple feedback schemes in the corresponding transmission mode, uplink scheduling information of the terminal when the network side applies the same length of the control bits of the DCI format to the uplink scheduling information of the terminal, or control information other than the information about the transmission control on the TB2.

It can be known from the foregoing analysis that, in the DCI format that supports transmission of control information of two codewords in the LTE Rel.8 system, the potentiality of enhancing efficiency of using the overhead occupied by the TB control bit and the "TB to CW swap flag" indication bit is great. Further, by taking the communication implementation mode of the LTE system of a higher version such as LTE Rel.9 or LTE Rel.10 system into consideration, the use of the overhead of the "TB to CW swap flag" indication bit in the DCI format is optimized to improve efficiency of using the resource overhead occupied by the transmission control information.

In this embodiment, an optimized setting process of the control bits in the DCI format may be based on the following principles:

1. Try to support transmission of control information corresponding to more transmission schemes in a DCI format.

In a possible implementation mode of the LTE Rel.9 or LTE Rel.10 system, it is necessary to improve spectral efficiency by supporting transmission schemes such as dual-stream beam forming, higher-order multi-input multi-output (Multiple-Input Multiple-Out-put, abbreviated as MIMO), and CoMP. Such transmission schemes are new relative to the LTE Rel.8 system, and can optimize the efficiency of using the overhead resources occupied by the control bits so that the control information of the most possible transmission schemes may be indicated by one DCI format. In this way, after the network side indicates the current data transmission mode in a semi-static manner, the terminal side may obtain the required control information by detecting the control bits in a DCI format dynamically, and the network side may swap the control information dynamically to indicate multiple transmission schemes, which improves the spectral efficiency.

2. Try to reduce the cost required for upgrading the LTE Rel.8 system.

One of the modes of reducing the cost of upgrading the LTE Rel.8 system is to reduce the change of the decoding process when the terminal receives the control information. Therefore, in the process of optimized setting of the DCI format of the control information, the DCI format that has the same length as that in the existing LTE Rel.8 system is preferred, and the functions of some control bits need to be extended or changed on the basis of the existing DCI format to improve the efficiency of using the resource overhead occupied by the control bits in the DCI format.

Based on the foregoing requirements and principles, in the embodiments of the present invention, validity indication bits may be set in the DCI format, where indication information indicating whether the control exercised by the network side on the transmission block is valid relative to the terminal is written into the validity indication bits. The validity indication bits may be newly-added control bits in an original DCI format, or original control bits in the DCI format, where indication information written into the original control bits is redundant indication information in the current transmission status. The validity indication bits are located outside the transmission control bits, and the number of bits occupied by the validity indication bits is less than or equal to the number of transmission blocks of transmission control indications that may be written into the DCI format. For example, if transmission control indications of 2 transmission blocks are written into the DCI format, the validity indication bits may occupy 1 or 2 bits. If transmission control exercised by the network side on a transmission block at a specific scheduling time is invalid relative to the current terminal, the 1 bit of overhead occupied by the "TB to CW swap flag" control bit and the 8 bits occupied by the transmission control bits corresponding to the transmission blocks under invalid transmission control may be used for carrying other control information. Besides, if the terminal in the communication system uses the dedicated demodulation signal to demodulate data and respective codewords correspond to the same number of layers, the terminal side does not need to acquire the indication information indicating whether to swap the corresponding relationship between the transmission block and the codeword, and the bit overhead occupied by the "TB to CW swap flag" control bits may be used for transmitting other control information.

In the embodiment of the present invention, the network side device extends or changes the functions of some control bits in the DCI format of the control information, and uses the control bits in the DCI format 2 and format 2A of the LTE Rel.8 system to fulfill transmission control in new data transmission schemes of the upgraded systems such as LTE Rel.9 and LTE Rel10. Any one of such DCI formats may be used to support transmission control of a variety of data transmission schemes, which facilitates flexible and dynamical swap between different downlink data transmission schemes.

By taking a DCI format that supports a transmission control indication of two codewords as an example, implementation modes for improving the efficiency of using a resource overhead occupied by control information transmission according to the present invention are described.

Figure 4A:
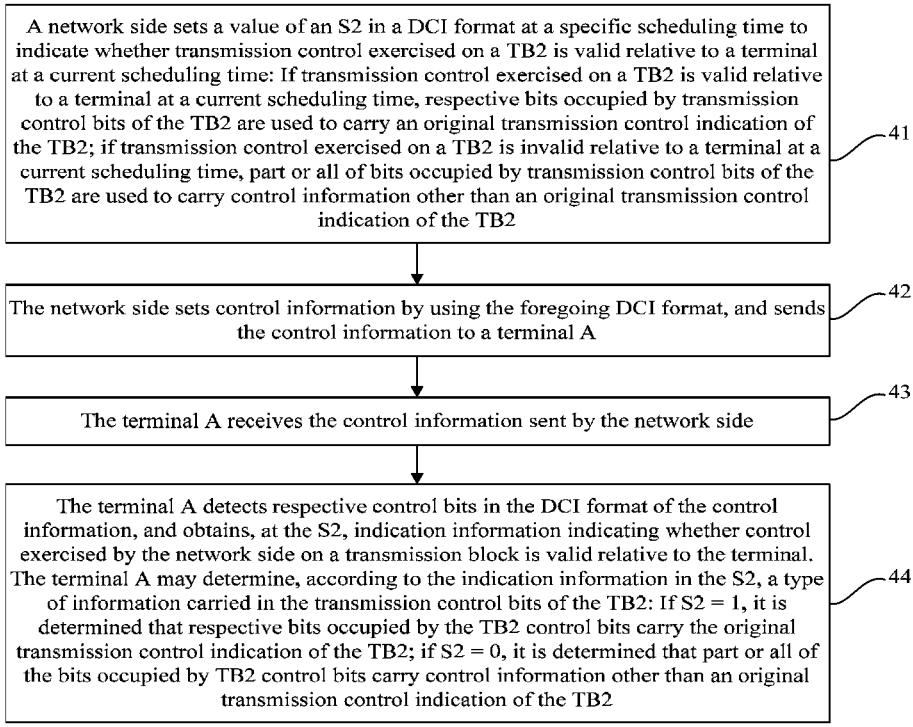
FIG. 4a is a flowchart of a method for sending and receiving control information according to a fifth embodiment of the present invention.
Figure 4B:
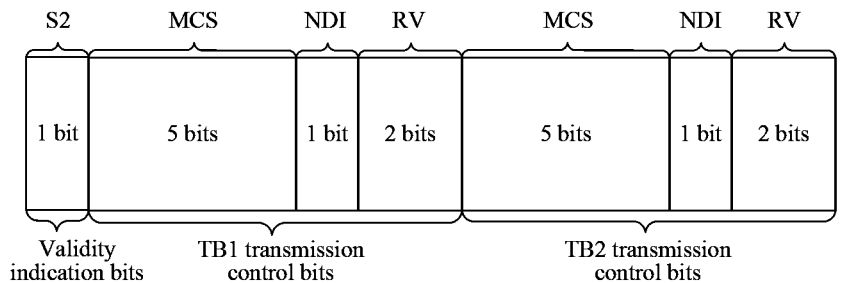
FIG. 4b is a schematic diagram of some control bits in a DCI format that supports transmission of two codewords according to an embodiment of the present invention.

FIG. 4a is a flowchart of a method for sending and receiving control information according to a fifth embodiment of the present invention. FIG. 4b is a schematic diagram of some control bits in a DCI format that supports transmission of two codewords according to an embodiment of the present invention. In this embodiment, it is assumed that a validity indication bit occupies 1 bit, which is expressed as S2 and used to carry indication information indicating whether transmission control exercised by a network side on a specific transmission block such as a TB2 is valid relative to a terminal. As shown in FIG. 4a and FIG. 4b, the method for sending and receiving control information in this embodiment includes:

Step 41: A network side sets a value of an S2 in a DCI format at a specific scheduling time to indicate whether transmission control exercised on a TB2 is valid relative to a terminal at a current scheduling time: If the transmission control on the TB2 is valid relative to the terminal, respective bits occupied by transmission control bits of the TB2 are used to carry an original transmission control indication of the TB2; if the transmission control exercised by the network side on the TB2 is invalid relative to the terminal, part or all of bits occupied by transmission control bits of the TB2 are used to carry control information other than an original transmission control indication of the TB2.

Meanings of values of the S2 may be pre-negotiated between the network side and the terminal side. For example, S2=0: Transmission control on the TB2 is invalid relative to the terminal; and S2=1: Transmission control on the TB2 is valid relative to the terminal.

It is assumed that the network side schedules two transmission blocks, a TB1 and the TB2, for a terminal A at a specific scheduling time to transmit data, an instance of setting the control bits in the DCI format shown in FIG. 4b may be:

S2=1 is used to indicate that the transmission control on the TB2 is valid relative to the terminal.

The MCS, NDI, and RV indication bits in the TB1 control bits are used to indicate the transmission control information on the TB1; and The MCS, NDI, and RV indication bits in the TB2 control bits are used to indicate the transmission control information on the TB2.

It is assumed that the network side schedules one transmission block TB1 for the terminal A at a specific scheduling time to transmit data, an instance of setting the control bit in the DCI format shown in FIG. 4b may be:

S2=0 is used to indicate that the transmission control on the TB2 is invalid relative to the terminal.

The MCS, NDI, and RV indication bits in the TB1 control bits are used to indicate the transmission control information on the TB1.

The MCS, NDI, and RV indication bits in the TB2 control bits are used to indicate other control information.

For example, the foregoing other control information may be: indication information indicating an orthogonal reference signal occupied by a dedicated demodulation reference signal of the terminal A when the data of multiple users share the same time-frequency resources and in the case that their dedicated demodulation reference signals are orthogonal; or information indicating whether a single user occupies currently-scheduled time-frequency resources exclusively or multiple users share the currently-scheduled time-frequency resources; information indicating locations of resources such as a time frequency occupied by a dedicated demodulation reference signal on scheduled resources of the terminal A when a load occupied by a dedicated demodulation reference signal of a user is variable; configuration information indicating the number of OFDM symbols occupied by the PDCCHs of multiple cells during joint sending from multiple cells under a CoMP transmission scheme; information indicating the number of layers occupied by the terminal A in the case that the user data is adaptive; information indicating whether the control information of the terminal A is uplink or downlink control information when the network side applies the same length of control bits of the DCI format to the uplink scheduling information of the terminal and the downlink scheduling information of the terminal; indication information indicating component carriers of the terminal A in the case of carrier aggregation; and information indicating an uplink feedback scheme of the terminal A in the case that the terminal has multiple feedback schemes in the corresponding transmission mode, uplink scheduling information of the terminal when the network side applies the same length of the control bits of the DCI format to the uplink scheduling information of the terminal A, or control information other than the information about the transmission control on the TB2.

In this step, if the terminal side in the communication system uses the dedicated demodulation signal to obtain the channel estimated value required for demodulating data, and respective codewords correspond to the same number of layers, the 1 bit of overhead occupied by the "TB to CW swap flag" indication bit shown in FIG. 3 may also be used to carry the indication information indicating whether the transmission control on the transmission block is valid or invalid relative to the terminal. Persons skilled in the art understand that in this scenario, the 1 bit of overhead occupied by the "TB to CW swap flag" control bit may also be used for carrying the foregoing other control information; or, if the transmission control on the TB2 is invalid in this step, the 1 bit of overhead occupied by the "TB to CW swap flag" control bit shown in FIG. 3 may be used for carrying the foregoing other control information.

Step 42: The network side sets the control information by using the foregoing DCI format, and sends the control information to the terminal A.

Step 43: The terminal A receives the control information sent by the network side.

Step 44: The terminal A detects respective control bits in the DCI format of the control information, and obtains, at the S2, the indication information indicating whether control exercised by the network side on the transmission block is valid relative to the terminal. The terminal A may determine, according to the indication information in the S2, a type of the information carried in the transmission control bits of the TB2: If S2=1, it is determined that respective bits occupied by the TB2 control bits carry the original transmission control indication of the TB2; if S2=0, it is determined that part or all of the bits occupied by the TB2 control bits carry control information other than the original transmission control indication of the TB2.

In the method for sending and receiving control information in this embodiment, the network side predetermines the validity indication bits in the DCI format of the control information. If the transmission control exercised by the network side on the TB2 is invalid relative to the terminal at a specific scheduling time, 1 bit in this embodiment is enough for indicating whether the transmission control on the TB2 is valid. All or part of the bits occupied by the TB2 transmission control bits may be used for transmitting control information other than the information about the transmission control on the TB2, which improves the efficiency of using the resource overhead required for transmitting the control information. Further, if dedicated demodulation reference information used for determining the channel estimated value required for demodulating data is pre-allocated to the terminal side, and respective codewords correspond to the same number of layers, control information other than the information indicating whether to swap a corresponding relationship between a transmission block and a codeword is written into an original "TB to CW swap flag" control bit in the DCI format, which saves the resource overhead required for transmitting the control information. If, in this scenario, the original "TB to CW swap flag" control bit in the DCI format is used to indicate whether the transmission control exercised by the network side on the TB2 is valid relative to the terminal, it is conducive to keeping the length of the original DCI format in the LTE Rel.8 system unchanged and reducing the cost of upgrading the LTE Rel.8 system.

Figure 5A:
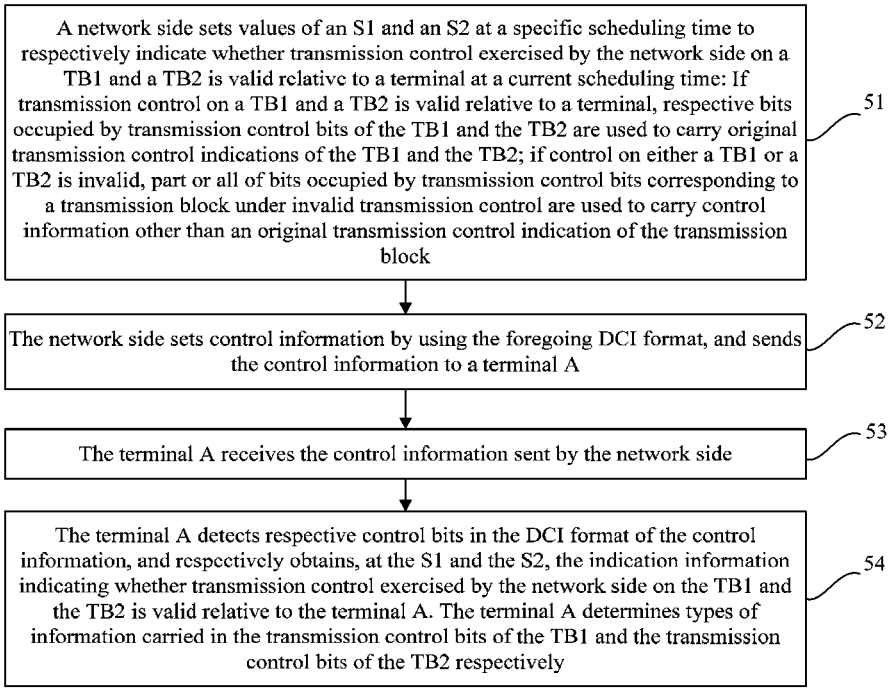
FIG. 5a is a flowchart of a method for sending and receiving control information according to a sixth embodiment of the present invention.
Figure 5B:
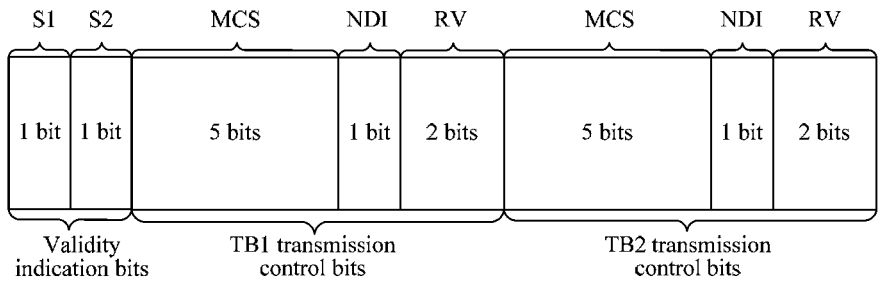
FIG. 5b is a schematic diagram of some control bits in another DCI format that supports transmission of two codewords according to an embodiment of the present invention.

FIG. 5a is a flowchart of a method for sending and receiving control information according to a sixth embodiment of the present invention. FIG. 5b is a schematic diagram of some control bits in another DCI format that supports transmission of two codewords according to an embodiment of the present invention. A frame structure shown in FIG. 5b differs from that shown in FIG. 4b in that: In the frame structure shown in FIG. 5b, transmission block status indication bits occupy 2 bits. The two bits are expressed as S1 and S2 respectively, and each bit is used to indicate whether transmission control exercised by the network side on a transmission block is valid relative to the terminal. As shown in FIG. 5a and FIG. 5b, the method for sending and receiving control information in this embodiment includes:

Step 51: A network side sets values of an S1 and an S2 at a specific scheduling time to indicate whether transmission control exercised by the network side on a TB1 and a TB2 is valid relative to a terminal at a current scheduling time respectively: If the transmission control on both the TB1 and the TB2 is valid relative to the terminal, respective bits occupied by control bits of the TB1 and the TB2 are used to carry an original transmission control indication of the TB1 and an original transmission control indication of the TB2 respectively; if the transmission control exercised on either the TB1 or the TB2 is invalid, part or all of the bits occupied by transmission control bits of a transmission block under invalid transmission control are used to carry control information other than an original transmission control indication of this transmission block.

Meanings of values of the S1 and the S2 may be pre-negotiated between the network side and the terminal side. For example, S1=0: Transmission control on the TB1 is invalid relative to the terminal;

S1=1: Transmission control on the TB1 is valid relative to the terminal;

S2=0: Transmission control on the TB2 is invalid relative to the terminal; and

S2=1: Transmission control on the TB2 is valid relative to the terminal.

If the network side schedules two transmission blocks, the TB1 and the TB2, for a terminal A at a specific scheduling time to transmit data, namely, S1=1 and S2=1, the MCS, NDI, and RV indication bits of TB1 control bits are used to indicate the transmission control information on the TB1; and the MCS, NDI, and RV indication bits of TB2 control bits are used to indicate the transmission control information on the TB2.

If the network side schedules one transmission block, the TB1 or the TB2, for a terminal A at a specific scheduling time to transmit data, for example, transmit data over the transmission block TB1, S1=1 and S2=0. In this case, the MCS, NDI, and RV indication bits of TB1 control bits are used to carry an original transmission control indication of the TB1, and part or all of the bits occupied by the MCS, NDI, and RV indication bits of TB2 control bits are used to transmit control information other than an original transmission control indication of the TB2; or, if S1=0 and S2=1, part or all of bits occupied by the MCS, NDI, and RV indication bits of TB1 control bits are used to carry control information other than an original transmission control indication of the TB1, and the MCS, NDI, and RV indication bits of TB2 control bits are used to carry an original transmission control indication of the TB2.

For example, the foregoing other control information may be: indication information indicating an orthogonal reference signal occupied by a dedicated demodulation reference signal of the terminal A when the data of multiple users share the same time-frequency resources and in the case that their dedicated demodulation reference signals are orthogonal; or information indicating whether a single user occupies currently-scheduled time-frequency resources exclusively or multiple users share the currently-scheduled time-frequency resources; information indicating locations of resources such as a time frequency occupied by a dedicated demodulation reference signal on scheduled resources of the terminal A when a load occupied by a dedicated demodulation reference signal of a user is variable; configuration information indicating the number of OFDM symbols occupied by the PDCCHs of multiple cells during joint sending from multiple cells under a CoMP transmission scheme; information indicating the number of layers occupied by the terminal A in the case that the user data is adaptive; information indicating whether the control information of the terminal A is uplink or downlink control information when the network side applies the same length of control bits of the DCI format to the uplink scheduling information of the terminal and the downlink scheduling information of the terminal; indication information indicating component carriers of the terminal A in the case of carrier aggregation; and information indicating an uplink feedback scheme of the terminal A in the case that the terminal has multiple feedback schemes in the corresponding transmission mode, uplink scheduling information of the terminal when the network side applies the same length of the control bits of the DCI format to the uplink scheduling information of the terminal A, or other control information except the original transmission control indication of this transmission block.

In this step, if the terminal side in the communication system uses the dedicated demodulation signal to obtain the channel estimated value required for demodulating data, and respective codewords correspond to the same number of layers, the 1 bit of overhead occupied by the "TB to CW swap flag" control bit shown in FIG. 3 may also be used to carry the indication information indicating whether the transmission control on a transmission block is valid or invalid. Persons skilled in the art understand that in this scenario, the 1 bit of overhead occupied by the "TB to CW swap flag" control bit may also be used for carrying the foregoing other control information; or, if the transmission control exercised by the network side on either the TB1 or the TB2 is invalid relative to the terminal A in this step, the 1 bit of overhead occupied by the "TB to CW swap flag" control bit shown in FIG. 3 may be used for carrying the foregoing other control information.

Step 52: The network side sets the control information by using the foregoing DCI format, and sends the control information to the terminal A.

Step 53: The terminal A receives the control information sent by the network side.

Step 54: The terminal A detects respective control bits in the DCI format of the control information, and obtains, at the S1 and the S2 respectively, the indication information indicating whether control exercised by the network side on the TB1 and the TB2 is valid relative to the terminal. According to the information obtained at the S1 and the S2 respectively, the terminal A determines types of the information carried in the TB1 transmission control bits and the TB2 transmission control bits separately: If 51=1, it is determined that the respective bits occupied by the TB1 transmission control bits carry the original transmission control indication of the TB1; if S1=0, it is determined that the control information carried in part or all of the bits occupied by the TB1 transmission control bits is control information other than the original transmission control indication of the TB1; if S2=1, it is determined that the respective bits occupied by the TB2 control bits carry the original transmission control indication of the TB2; if S2=0, it is determined that the control information carried in part or all of the bits occupied by the TB2 transmission control bits is control information other than the original transmission control indication of the TB2.

The method for sending and receiving control information in this embodiment enriches indication modes of indicating whether the transmission control exercised by the network side on each transmission block is valid relative to the terminal in the DCI format on the basis of accomplishing the technical effects similar to those of FIG. 4a, and improves the flexibility of transmitting the indication information indicating whether the transmission control on the transmission block is valid.

Figure 6:
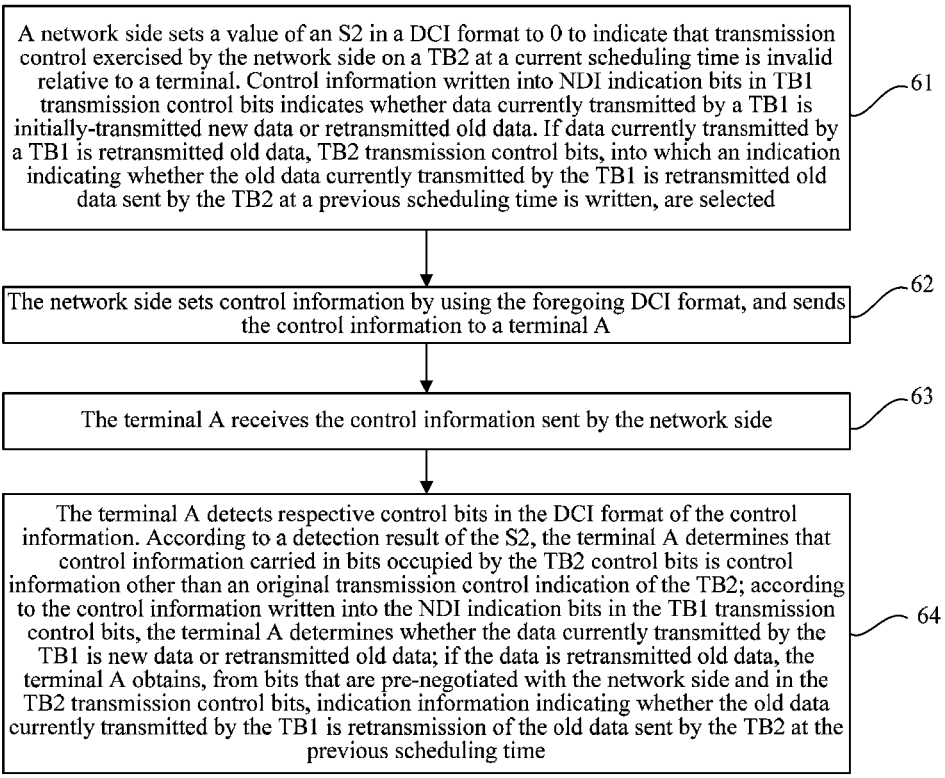
FIG. 6 is a flowchart of a method for sending and receiving control information according to a seventh embodiment of the present invention.

FIG. 6 is a flowchart of a method for sending and receiving control information according to a seventh embodiment of the present invention. An application scenario in this embodiment is: A network side schedules 2 transmission blocks, a TB1 and a TB2, for a terminal A at a previous scheduling time, but changes a scheduling policy on the terminal A at a current scheduling time as: scheduling one transmission block, the TB1 or the TB2, to transmit data (in this embodiment, an example that the network side schedules the TB1 for the terminal A is taken). In this embodiment, the DCI format shown in FIG. 4b may be used to deliver the control information. Specifically, the method for sending and receiving control information in this embodiment includes:

Step 61: A network side sets a value of an S2 in a DCI format to 0 to indicate that transmission control exercised by the network side on a TB2 at a current scheduling time is invalid relative to a terminal A. Control information written into NDI indication bits in TB1 transmission control bits indicates whether data currently transmitted by a TB1 is initially-transmitted new data or retransmitted old data. If the control information written into the NDI indication bits in the TB1 transmission control bits indicates that the data currently transmitted by the TB1 is the retransmitted old data, TB2 transmission control bits, into which an indication indicating whether the old data currently transmitted by the TB1 is retransmitted old data sent by the TB2 at a previous scheduling time is written, are selected.

If the control information is generated by setting the DCI format shown in FIG. 4b, because the validity indication bit in the DCI format occupies only 1 bit, the validity indication bit can only be used to carry an indication indicating whether transmission control exercised by the network side on either the TB1 or the TB2 is valid relative to the terminal. Therefore, in the application scenario of this embodiment, if the network side schedules 2 transmission blocks, the TB1 and the TB2, for the terminal A to transmit data at the previous scheduling time, but changes the scheduling policy on the terminal A at the current scheduling time as: scheduling one transmission block TB1 to transmit data, and, if the transmission control information of the TB1 shows that a current transmission status is retransmission of old data, the terminal A may be unable to distinguish whether the retransmission of old data is intended for the TB1 or the TB2 at the previous time, which is unfavorable to correct reception of data by the terminal A. For this application scenario, in this embodiment, an indication of a transmission block to which the currently-transmitted old data belongs, where the transmission block is controlled by a TB1 transmission control bits, is written into the TB2 transmission control bits. In this way, the terminal is enabled to acquire whether the old data currently transmitted by the TB1 is retransmission of old data of the TB1 or retransmission of old data of the TB2, and thus the data can be received correctly.

Because the control exercised by the network side on the TB2 is invalid at the current scheduling time relative to terminal A, control information other than the information about the transmission control on the TB2 may be written into the TB2 transmission control bits. Specifically, the TB1 transmission control bits indicate whether the currently-transmitted old data is retransmission of the old data sent by the TB2 at the previous scheduling time. Information may be written into any bit among the TB2 transmission control bits according to the negotiation between the network side and the terminal A, for example, may be written into an NDI indication bit, an MCS indication bit, an RV indication bit that are in the TB2 transmission control bits, or, another indication bit in the DCI format.

Step 62: The network side sets the control information by using the foregoing DCI format, and sends the control information to the terminal A.

Step 63: The terminal A receives the control information sent by the network side.

Step 64: The terminal A detects respective control bits in the DCI format of the control information. According to a detection result of the S2, the terminal A determines that control information carried in bits occupied by the TB2 control bits is control information other than an original transmission control indication of the TB2; according to control information written into the NDI indication bits in the TB1 transmission control bits, the terminal A determines whether data currently transmitted by the TB1 is new data or retransmitted old data; if the data is retransmitted old data, the terminal A obtains, from bits that are pre-negotiated with the network side in the TB2 transmission control bits, indication information indicating whether the old data currently transmitted by the TB1 is retransmission of the old data sent by the TB2 at the previous scheduling time.

By detecting the TB2 transmission control bits, the terminal A may obtain an indication indicating whether the old data currently transmitted by a TB1 transmission control indication is retransmission of the old data sent by the TB2 at the previous scheduling time. Specifically, the terminal A may obtain that the old data currently transmitted by the TB1 transmission control indication is retransmission of the old data sent by the TB2 at the previous scheduling time, or that the old data currently transmitted by the TB1 transmission control indication is not retransmission of the old data sent by the TB2 at the previous scheduling time. If the terminal A obtains that the old data currently transmitted by the TB1 transmission control indication is not retransmission of the old data sent by the TB2 at the previous scheduling time, it is determined that the old data currently transmitted by the TB1 transmission control indication is retransmission of the old data sent by the TB1 at the previous scheduling time.

On the basis of accomplishing the technical effects similar to those of FIG. 4a, the method for sending and receiving control information in this embodiment delivers validity indication information; when the data currently transmitted by the transmission block under valid transmission control is old data, a transmission control bit of the transmission block under invalid transmission control indicates a transmission block to which the old data belongs, and therefore, the control information can be delivered reliably when the schedulable transmission block of the terminal changes temporarily or in a similar application scenario, which reduces probability of data receiving errors of the terminal.

This embodiment is described by taking an example that a transmission control bit of a transmission block under invalid transmission control indicates a transmission block to which the old belongs. Understandably, the transmission block to which the old data belongs may also be indicated by other control bits in the DCI format. That is, the information indicating the transmission block to which the old data belongs, where the old data is retransmitted by the transmission block under valid transmission control, may be written into control bits other than the transmission control bits in the DCI format.

Figure 7:
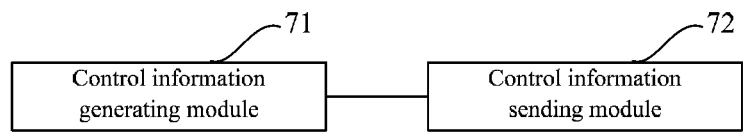
FIG. 7 is a schematic structural diagram of a network side device according to an eighth embodiment of the present invention.

FIG. 7 is a schematic structural diagram of a network side device according to an eighth embodiment of the present invention. As shown in FIG. 7, the network side device in this embodiment includes a control information generating module 71 and a control information sending module 72.

The control information generating module 71 is configured to set respective control bits in a DCI format to generate control information applied by a network side to a terminal, where the control bits include validity indication bits and transmission control bits, indication information indicating whether transmission control exercised by the network side on a transmission block is valid relative to the terminal is written into the validity indication bits, and the validity indication bits are located outside the transmission control bits; and The control information sending module 72 is configured to send the generated control information to the terminal.

In this scenario, the network side device in this embodiment predetermines the validity indication bits in the DCI format of the control information, and writes into the validity indication bits the indication information indicating whether the transmission control exercised by the network side on the transmission block is valid relative to the terminal, which saves a resource overhead required to be occupied. The saved overhead may be used for transmitting other control information. Therefore, efficiency of using the overhead required for transmitting the control information on the network side is improved. An implementation entity of the network side device in this embodiment is not limited, and may be a base station or an access network node. Reference may be made to the description about the embodiments shown in FIG. 1a, and FIG. 4a to FIG. 6 for its implementation mechanism, which is not repeatedly described here.

Alternatively, in the network side device in this embodiment, the control information generating module 71 may be configured to set respective control bits in a DCI format to generate control information applied by a network side to a terminal, where control information other than indication information indicating whether to swap a corresponding relationship between a transmission block and a codeword is written into a control bit into which the indication information indicating whether to swap a corresponding relationship between a transmission block and a codeword is originally written (namely, a "TB to CW swap flag" control bit), and the control bit is in the DCI format, if a dedicated demodulation reference signal used to demodulate data is preconfigured by the network side for the terminal and respective codewords correspond to the same number of layers.

The control information sending module 72 may be configured to send the generated control information to the terminal.

In this scenario, the network side device in this embodiment determines a function of the "TB to CW swap flag" control bit with reference to a current transmission status of the transmission block. If the indication information indicating whether to swap a corresponding relationship between a transmission block and a codeword is meaningless redundant indication information in the current transmission status, the control information other than the indication information indicating whether to swap a corresponding relationship between a transmission block and a codeword may be written into the "TB to CW swap flag" control bit, which saves a resource overhead required to be occupied for transmitting other control information, and improves efficiency of using an overhead required for transmitting the control information on the network side. An implementation entity of the network side device in this embodiment is not limited, and may be a base station or an access network node. Reference may be made to the description about the embodiments shown in FIG. 2a, and FIG. 4a to FIG. 6 for its implementation mechanism, which is not repeatedly described here.

Figure 8:
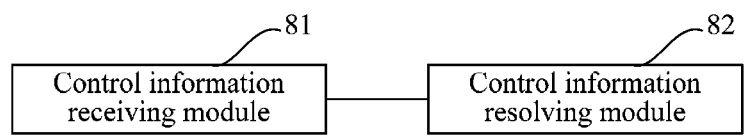
FIG. 8 is a schematic structural diagram of a terminal side device according to a ninth embodiment of the present invention.

FIG. 8 is a schematic structural diagram of a terminal side device according to a ninth embodiment of the present invention. As shown in FIG. 8, the terminal side device in this embodiment includes a control information receiving module 81 and a control information resolving module 82.

The control information receiving module 81 is configured to receive control information sent by a network side, where control bits of a DCI format of the control information include validity indication bits and transmission control bits, and the validity indication bits are located outside the transmission control bits; and The control bit resolving module 82 is configured to obtain, from the validity indication bits, indication information indicating whether transmission control exercised by the network side on a transmission block is valid relative to a current terminal.

In this scenario, by detecting one bit of the validity indication bits in the DCI format, the terminal side device in this embodiment may obtain the indication information indicating whether the control exercised by the network side on a transmission block is valid relative to the current terminal, which saves a resource overhead required to be occupied by the indication indicating whether the transmission control on the transmission block is valid. The saved overhead may be used for transmitting other control information. Therefore, efficiency of using an overhead required for transmitting the control information on the network side is improved, and efficiency of obtaining downlink control information by the terminal side is also improved. An implementation entity of the terminal side device in this embodiment is not limited, and may be a user equipment or a mobile phone. Reference may be made to the description about the embodiments shown in FIG. 1b, and FIG. 4a to FIG. 6 for its implementation mechanism, which is not repeatedly described here.

Alternatively, the control information receiving module 81 of the terminal side device in this embodiment is configured to receive the control information sent by the network side.

The control bit resolving module 82 is configured to obtain control information other than indication information indicating whether to swap a corresponding relationship between a transmission block and a codeword from a control bit into which the indication information indicating whether to swap a corresponding relationship between a transmission block and a codeword is originally written (namely, a "TB to CW swap flag" control bit), where the control bit is in a DCI format of the control information, if a dedicated demodulation reference signal used to demodulate data is preconfigured by the network side for a current terminal and respective codewords correspond to the same number of layers.

In this scenario, through the terminal side device in this embodiment, if the indication information indicating whether to swap a corresponding relationship between a transmission block and a codeword is meaningless redundant indication information in a current transmission status, the control information other than the indication information indicating whether to swap a corresponding relationship between a transmission block and a codeword is written into the "TB to CW swap flag" control bit. By detecting the "TB to CW swap flag" control bit, the current terminal may obtain the control information other than the indication information indicating whether to swap a corresponding relationship between a transmission block and a codeword, which saves a resource overhead required to be occupied for transmitting other control information, and improves efficiency of using an overhead required for transmitting the control information on the network side. An implementation entity of the network side device in this embodiment is not limited, and may be a base station or an access network node. Reference may be made to the description about the embodiments shown in FIG. 2b, and FIG. 4a to FIG. 6 for its implementation mechanism, which is not repeatedly described here.

Figure 9:
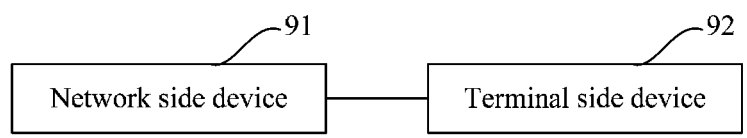
FIG. 9 is a schematic structural diagram of a communication system according to a tenth embodiment of the present invention.

FIG. 9 is a schematic structural diagram of a communication system according to a tenth embodiment of the present invention. As shown in FIG. 9, the communication system in this embodiment includes a network side device 91 and a terminal side device 92.

The network side device 91 is configured to: set respective control bits in a DCI format to generate control information on the terminal side device 92, where the respective control bits in the DCI format include validity indication bits and transmission control bits, indication information indicating whether transmission control exercised by the network side device 91 on a transmission block is valid relative to the terminal side device 92 is written into the validity indication bits, and the validity indication bits are located outside the transmission control bits; and send the generated control information to the terminal side device 92.

The terminal side device 92 is configured to: receive the control information sent by the network side device 91; and obtain, from the validity indication bits in the DCI format of the control information, the indication information indicating whether the transmission control exercised by the network side device 91 on the transmission block is valid relative to the terminal side device 92.

Alternatively, the network side device 91 is configured to: set respective control bits in a DCI format to generate control information on the network side device 92, where control information other than indication information indicating whether to swap a corresponding relationship between a transmission block and a codeword is written into a control bit into which the indication information indicating whether to swap a corresponding relationship between a transmission block and a codeword is originally written (namely, a "TB to CW swap flag" control bit), and the control bit is in the DCI format, if a dedicated demodulation reference signal used to demodulate data is preconfigured for the terminal side device 92 and respective codewords correspond to the same number of layers; send the generated control information to the terminal side device 92.

The terminal side device 92 is configured to: receive the control information sent by the network side device 91, and obtain, from the "TB to CW swap flag" control bit in the DCI format of the control information, the control information other than the indication information indicating whether to swap a corresponding relationship between a transmission block and a codeword.

In the communication system in the embodiment of the present invention, the network side device extends or changes functions of some control bits in the DCI format of the control information, so as to improve efficiency of using a resource overhead occupied by the control bits in the DCI format of the control information, and improve efficiency of using an overhead required for transmitting the control information. Reference may be made to the description about the embodiments shown in FIG. 1a to FIG. 6 for implementation mechanisms of the network side device or terminal side device in the communication system, which are not repeatedly described here.

It is understandable to those of ordinary skill in the art that the accompanying drawing is only a schematic diagram of an embodiment, and the modules or processes in the accompanying drawing are not necessarily required for implementing the present invention.

It is understandable to those of ordinary skill in the art that the modules in an apparatus in an embodiment may be distributed in the apparatus in the embodiment according to the description of the embodiment, or may be located in one or more apparatuses different from the embodiment through corresponding changes. The modules in the foregoing embodiments may be combined into one module, and may also be split into multiple submodules.

The sequence number of the foregoing embodiments of the present invention is for ease of description rather than representative of a preference order of the embodiments.

Persons of ordinary skill in the art should understand that all or part of the steps of the foregoing method embodiments may be implemented by a program instructing relevant hardware. The program may be stored in a computer readable storage medium. When the program is executed, the steps of the foregoing method embodiments are executed. The storage medium may be any medium that may store program codes, such as a ROM, a RAM, a magnetic disk, or an optical disk.

Finally, it should be noted that the foregoing embodiments are merely provided for describing the technical solutions of the present invention, but not intended to limit the present invention. Although the present invention is described in detail with reference to the foregoing embodiments, it is apparent that persons of ordinary skill in the art may still make various modifications to the technical solutions recorded in the foregoing embodiments, or make equivalent replacements to part of the technical features of the technical solutions recorded in the foregoing embodiments; however, these modifications or replacements do not make the corresponding technical solutions depart from the spirit and scope of the technical solutions of the embodiments of the present invention.

What is claimed is:

1. A method for receiving control information, the method comprising:
   receiving, by a terminal, control information having one of a first downlink control information (DCI) format and a second DCI format,
      wherein when a dedicated demodulation reference signal for demodulating data is not preconfigured by a base station for the terminal, the first DCI format contains a transmission block to a codeword swap flag control bit field for the terminal, and
      when the dedicated demodulation reference signal for demodulating data is preconfigured by the base station for the terminal, the second DCI format does not contain the transmission block to the codeword swap flag control bit field for the terminal; and
   obtaining control bits from the received control information.

2. The method according to claim 1, wherein the transmission block to codeword swap flag control bit field carries indication information indicating whether to swap a relationship between a transmission block and a codeword.

3. The method according to claim 1, wherein
   if a value of the transmission block to codeword swap flag control bit field is 0, the transmission block to codeword swap flag control bit field indicates that a transmission block 1 is associated with a codeword 0 and a transmission block 2 is associated with a codeword 1; and
   if the value of the transmission block to codeword swap flag control bit field is 1, the transmission block to codeword swap flag control bit field indicates that the transmission block 2 is associated with the codeword 0 and the transmission block 1 is associated with the codeword 1.

4. An apparatus in a terminal for receiving control information, the apparatus comprising:
   one or more processors;
   a non-transitory memory for storing computer instructions that, when executed by the one or more processors, cause the terminal to perform the following:
      receiving control information having one of a first downlink control information (DCI) format and a second DCI format,
         wherein when a dedicated demodulation reference signal for demodulating data is not preconfigured by a base station for the terminal, the first DCI format contains a transmission block to a codeword swap flag control bit field for the terminal, and
         when the dedicated demodulation reference signal for demodulating data is preconfigured by the base station for the terminal, the second DCI format does not contain the transmission block to the codeword swap flag control bit field for the terminal; and
      obtaining control bits from the received control information.

5. The apparatus according to claim 4, wherein the transmission block to codeword swap flag control bit field carries indication information indicating whether to swap a relationship between a transmission block and a codeword.

6. The apparatus according to claim 4, wherein
   if a value of the transmission block to codeword swap flag control bit field is 0, the transmission block to codeword swap flag control bit field indicates that a transmission block 1 is associated with a codeword 0 and a transmission block 2 is associated with a codeword 1; and
   if the value of the transmission block to codeword swap flag control bit field is 1, the transmission block to codeword swap flag control bit field indicates that the transmission block 2 is associated with the codeword 0 and the transmission block 1 is associated with the codeword 1.

7. A method for sending control information, the method comprising:
   generating, by a base station, control information having one of a first downlink control information (DCI) format and a second DCI format,
      wherein when a dedicated demodulation reference signal for demodulating data is not preconfigured by the base station for a terminal, the first DCI format contains a transmission block to a codeword swap flag control bit field for the terminal, and
      when the dedicated demodulation reference signal for demodulating data is preconfigured by the base station for the terminal, the second DCI format does not contain the transmission block to the codeword swap flag control bit field for the terminal; and
   sending the control information.

8. The method according to claim 7, wherein the transmission block to codeword swap flag control bit field carries indication information indicating whether to swap a relationship between a transmission block and a codeword.

9. The method according to claim 7, wherein
if a value of the transmission block to codeword swap flag control bit field is 0, the transmission block to codeword swap flag control bit field indicates that a transmission block 1 is associated with a codeword 0 and a transmission block 2 is associated with a codeword 1; and if the value of the transmission block to codeword swap flag control bit field is 1, the transmission block to codeword swap flag control bit field indicates that the transmission block 2 is associated with the codeword 0 and the transmission block 1 is associated with the codeword 1.

10. An apparatus in a base station for sending control information, the apparatus comprising:
one or more processors;
a non-transitory memory for storing computer instructions that, when executed by the one or more processors, cause the base station to perform the following:
generating control information having one of a first downlink control information (DCI) format and a second DCI format, wherein
when a dedicated demodulation reference signal for demodulating data is not preconfigured by the base station for a terminal, the first DCI format contains a transmission block to a codeword swap flag control bit field for the terminal, and
when the dedicated demodulation reference signal for demodulating data is preconfigured by the base station for the terminal, the second DCI format does not contain the transmission block to the codeword swap flag control bit field for the terminal; and
sending the control information.

11. The apparatus according to claim 10, wherein the transmission block to codeword swap flag control bit field carries indication information indicating whether to swap a relationship between a transmission block and a codeword.

12. The apparatus according to claim 10, wherein
if a value of the transmission block to codeword swap flag control bit field is 0, the transmission block to codeword swap flag control bit field indicates that a transmission block 1 is associated with a codeword 0 and a transmission block 2 is associated with a codeword 1; and if the value of the transmission block to codeword swap flag control bit field is 1, the transmission block to codeword swap flag control bit field indicates that the transmission block 2 is associated with the codeword 0 and the transmission block 1 is associated with the codeword 1.

* * * * *